United States Patent Office 2,970,472
Patented Feb. 7, 1961

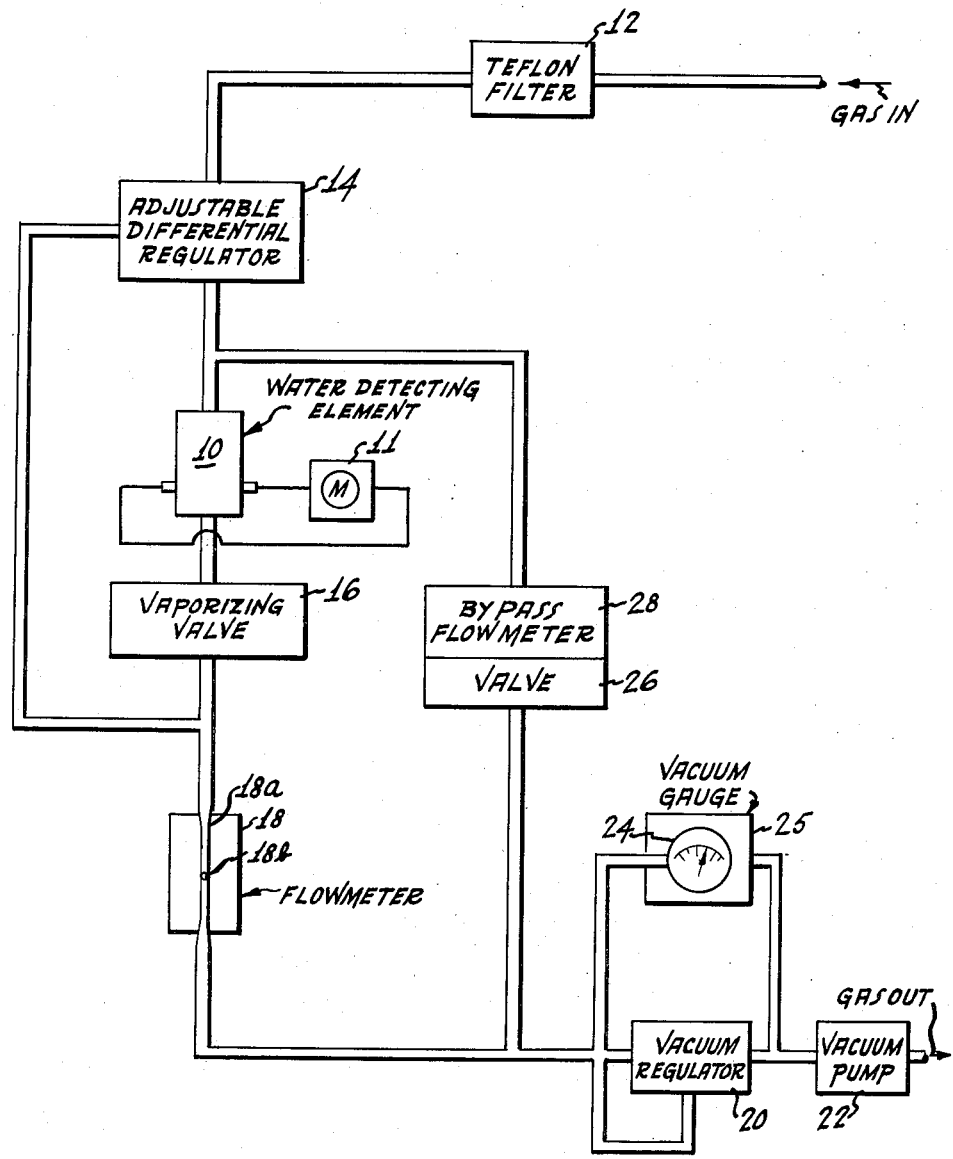

2,970,472

GAS FLOW RATE INDICATING AND CONTROLLING SYSTEM

William R. Jones, New Britain, and Gustav Bergson, Jenkintown, Pa.; said Jones assignor to Manufacturers Engineering and Equipment Corporation, a corporation of Pennsylvania Filed Dec. 3, 1958, Ser. No. 777,900

1 Claim. (Cl. 73—199)

This invention relates to systems for precisely controlling and indicating extremely low rates of gas flow.

For certain purposes, such as in chemical processes and the like, it is often desirable to provide a means for controlling and indicating the flow rate of a gas being used. Systems for accurately controlling and indicating relatively high rates of flow have heretofore been provided; however no suitable means adapted for industrial use has been disclosed for providing an accurate and economical means for indication and control of very low rates of gas flow, such as on the order of 1 cubic centimeter per minute (1 cc./min.).

It is accordingly an object of this invention to provide an improved system for accurately indicating and controlling low rates of gas flow.

It is another object of this invention to provide an improved system for accurately indicating and controlling the flow rate of a gas at rates on the order of 1 cc./min.

In accordance with the invention the gas flow is controlled at a constant low rate of flow by passing the gas through a differential pressure regulator of a conventional type adapted to regulate higher rates of flow such as on the order of 100 cc./min. Due to mechanical tolerances such regulators are highly unstable for controlling lower rates of flow on the order of 1 cc./min. The gas stream from the regulator is then separated into two parallel paths: one path through a fine needle valve and a conventional flowmeter of the type having a tapered tube and a float; and a second path through a second valve. The regulator is connected to maintain the pressure across the fine needle valve constant, so that this valve may be adjusted to a desired low rate of flow, such as on the order of 1 cc./min., the flow rate will be maintained constant. The second valve is then set so that the amount of gas passed thereby will raise the total flow rate through the regulator sufficiently to insure stable operation thereof.

Flowmeters of the type having a tapered tube and a float are commercially available for indicating gas flow rates from about 0 to 50 cc./min. However, where the flow rates to be measured are from zero to 5 cc./min., the indications on such meters are compressed to a small portion of the indicator scale, and it is impossible to obtain an accurate reading. The pressure at the outlet ports of these meters is commonly in the neighborhood of atmospheric pressure.

Further in accordance with this invention it has been found that by reducing the pressure at the outlet port below atmospheric, the indicator range is expanded by approximately the inverse of the square root of the absolute pressure measured in atmospheres. In other words, if the pressure at the outlet port is reduced to about a hundredth of atmospheric pressure then the flow meter reading of approximately 10 on the 50 cc./min. rate of gas flow.

The novel features that are considered to be characteristic of this invention are set forth with particularity in the appended claim. The invention itself, however, both as to its organization and method of operation, as well as additional objects and advantages thereof, will best be understood from the following description when read in connection with the accompanying drawing, the sole figure of which is a simplified flow diagram of a gas flow rate indicating and controlling system embodying the invention.

The gas flow rate indicating and controlling system shown in the drawing is used in conjunction with a system for detecting the quantity of water present in a gas. The water detecting element 10 comprises an extremely sensitive means for detecting the water content of a gas in a few parts per million by absorption and electrolysis of water from a gas flow stream. The heart of the water detecting element 10 is an electrolysis cell, which draws an electrical current as a function of the amount of water electrolyzed. The current drawn by the electrolysis cell is indicated on a measuring apparatus 11 including a meter which may be calibrated to read water in parts per million. The measuring apparatus also includes the power supply for the electrolysis cell.

It has been found that where the water detecting element 10 is used in a gas stream moving at 100 cc./min. and containing on the order of 20,000 parts per million (p.p.m.) of water, the water detecting element fails after a short period of use. It has also been found that the life of the water detecting element can be greatly increased by reducing the total quantity of water to be absorbed from the gas stream. This may be done by reducing the rate of flow of gas past the water absorbing element, and in the present case the desired rate of flow is on the order of 1 cc./min. However, in order to determine the water content of the gas from the readings of the water detector 10, it is necessary to know the flow rate of the gas. The system described herein affords a simple and accurate means for indicating and controlling gas flow rates on the order of 1 cc./min. It will be understood that the flow rate indicating and controlling system of the invention is not restricted to use with the water detecting element described above, but is generally useful for indicating and controlling very low rates of gas flow.

Gas from the source whose water content is to be measured is passed through a Teflon filter 12 to remove dust or other particles which might impair the operation of the gas flow regulating apparatus or the water detecting element. After passing through the filter 12, the gas is passed through an adjustable differential regulator 14, the water detecting element 10, and a fine needle valve 16 in the order named. The needle valve, which may be a vaporizing valve generally of the type described in the copending application of Gustav Bergson filed May 2, 1958, Serial Number 732,583 and entitled "Vaporizing Valve," is adjusted to establish the desired rate of gas flow through the water detecting element 10. The adjustable differential regulator 14 serves the purpose of maintaining a constant pressure across the needle valve 16 and water detecting element 10, to maintain the gas flow at the desired rate. Any suitable adjustable differential regulator may be used such as those of the type wherein the differential pressure between the inlet port of the water detecting element 10 and the outlet port of the needle valve 16 is used to control a diaphragm which in turn controls the gas flow through the regulator. To illustrate, as the pressure drop across the water detecting element 10 and needle valve 16 increases due to an increased rate of flow, the adjustable differential regulator diaphragm operates to impede the flow of gas therethrough so that the gas flow rate will be maintained at a constant value.

From the needle valve 16, the gas is passed through a conventional flowmeter 18 for measuring relatively low rates of gas flow. An example of such a flowmeter is the type having a tapered tube 18a with a float 18b which is commercially available under the trade name Flow Rators, manufactured by Fisher and Porter Co. These meters are capable of indicating gas flow rates of from 0 to 43 cc./min. However, where the flow rates to be measured are on the order of 1 cc./min. as in the present case, the indications are compressed to such a small portion of the indicator scale that an accurate reading is impossible to obtain. It will be noted that an error of 0.5 cc./min. where the desired flow rate is 1 cc./min. is a 50% error, and results in a corresponding error in the water content indication. The term on the order of 1 cc./min. as used in this application designates flow rates from 0–10 cc./min.

In accordance with this invention, it has been found that instead of maintaining the outlet port of the flowmeter 18 at pressures near atmospheric as has been the usual practice, the indicator range may be expanded by reducing the pressure at the outlet port. The expansion of the indicator scale was found to be approximately inversely proportional to the square root of the absolute pressure measured in atmospheres. To illustrate, when the outlet port pressure of the flowmeter 18 is reduced to about $1/100$ of an atmosphere, then the full scale reading of 43 cc./min. indicates a flow rate of 4.3 cc./min. of the gas at atmospheric pressure through the water detecting element 10. By calibrating the meter when a given partial vacuum is maintained at the outlet port thereof, a scale may be provided so that the gas flow rate through the water detecting element 10 may be read directly.

The desired pressure is maintained at the outlet port of the flowmeter 18, by a vacuum regulator 20, which is connected between the flowmeter and a vacuum pump 22. A vacuum gauge 24 is connected across the vacuum regulator to provide an indication of the actual pressure in inches of water existing at the outlet port of the flowmeter 18.

The vacuum pump maintains a vacuum of nearly 0 inches of water at the outlet side of the regulator 20. The regulator 20 which is of the same construction as the regulator 14 is connected so that a constant pressure differential is maintained thereacross. This pressure differential is measured by the gauge 24. The vacuum gauge 24 consists of a conventional bellows type pressure gauge connected to the inlet side of the regulator 20. The gauge 24 is enclosed in a chamber 25 which is evacuated to approximately 0 inches of water by the vacuum pump 22, and the gauge scale is calibrated to read in inches of water. By adjusting the regulator 20 and observing the reading on the vacuum gauge 24, the pressure at the outlet port of the flowmeter 18 may be set to the desired value.

Due to mechanical instability, the adjustable differential regulator 14 will not maintain a constant pressure across the water detector 10 and vaporizing valve 16 over long periods of time. This is because the mechanical tolerances of the regulator 14 are such that slight movements of a gas flow controlling diaphragm contained therein for flow rates on the order of 1 cc./min. do not necessarily produce proportional changes in flow rates. In order to operate the regulator 14 at a rate of gas flow at which this regulator does exhibit stable operating characteristics, a bypass line including a valve 26 and a flowmeter 28 is provided in parallel with the water detecting element 10, needle valve 16 and flowmeter 18. The bypass valve 26 is set to permit gas to flow therethrough at a rate of about 100 cc./min., at which the regulator will exhibit stable long term operation.

The bypass line including the valve 26 and flowmeter 28 provide the additional advantage of permitting the gas in the feed line to reach the water detecting element 10 much more quickly. This is because flow rates on the order of 1 cc./min. are very slow, and a change in the water content of the gas at the main supply point would not be noticed quickly since a certain time would be required to use up the gas in the measuring system pipe line to the water detecting element 10. However, with the bypass line the gas flow up to the water detecting element 10 moves at a flow rate on the order of 100 cc./min. and thereby greatly reduces this time lag.

In order to calibrate the flow rate controlling system, the bypass line is cut-off. The regulator 14 is manually adjusted to maintain the indicated flow rate on the flowmeter 18 at a given value. The amount of gas passing through the system is measured at the outlet port of the vacuum regulator 20 by any suitable means so that the gas flow rate through the water detecting element 10 can be calculated. If the flow rate as measured and calculated at the outlet port of the vacuum regulator differs from the flow rate as indicated on the flowmeter 18, then the vacuum at the outlet port at the flowmeter may be adjusted so that the flowmeter calibration will indicate the actual flow rate through the water detecting element 10 for the given gas to be controlled under the operating conditions in which the flow rate controlling and indicating system must operate.

What is claimed is:

A gas flow controlling and indicating system comprising a differential pressure regulator, means for passing gas through said regulator, a fine needle valve and a flowmeter of the type including a tapered tube and a float connected in series to receive a portion of the gas from said regulator, said fine needle valve adjustable to restrict the flow rate of gas therethrough to rates on the order of 1 cc./minute, means providing a bypass valve also connected to receive gas from said regulator in parallel with said fine needle valve and flowmeter, said bypass valve means adjustable to provide a total flow rate through said regulator at which said regulator exhibits stable operation, said regulator being connected to maintain a constant pressure across said needle valve, and means for maintaining a partial vacuum at the outlet ports of said flowmeter and said bypass valve, the indication on said flowmeter being expanded by a factor approximately proportional to an inverse function of the vacuum at said outlet ports measured in atmospheres.

References Cited in the file of this patent

UNITED STATES PATENTS 2,862,387  Webster _____ Dec. 2, 1958

OTHER REFERENCES

"Rotameters," Schutte and Koerting Company, Bulletin No. 18–R, March 1939, pp–18056–57–58.